(12) United States Patent
Park

(10) Patent No.: US 12,187,359 B2
(45) Date of Patent: Jan. 7, 2025

(54) DEVICE FOR PREVENTING REVERSE INPUT AND STEERING DEVICE FOR PREVENTING REVERSE INPUT

(71) Applicant: HYUNDAI MOBIS CO., LTD., Seoul (KR)

(72) Inventor: Su Ju Park, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 18/487,187

(22) Filed: Oct. 16, 2023

(65) Prior Publication Data

US 2024/0149937 A1    May 9, 2024

(30) Foreign Application Priority Data

Nov. 9, 2022    (KR) .................. 10-2022-0148709

(51) Int. Cl.
*B62D 5/04*    (2006.01)
*F16D 15/00*    (2006.01)

(52) U.S. Cl.
CPC ............. *B62D 5/043* (2013.01); *F16D 15/00* (2013.01)

(58) Field of Classification Search
CPC ...... F16D 15/00; F16D 41/105; F16D 41/066; F16D 2041/0665; F16D 43/02; F16D 43/208; F16D 59/00; F16D 59/02; B62D 5/043
USPC .......................................... 192/223.2, 38, 44
See application file for complete search history.

(56) References Cited

U.S. PATENT DOCUMENTS

| 4,204,589 A | * | 5/1980 | Loker | ..................... F16D 11/06 464/33 |
| 4,852,707 A | * | 8/1989 | Ito | .......................... F16D 41/105 188/134 |
| 6,662,921 B2 | * | 12/2003 | Yoshida | ................ F16D 41/067 192/37 |

FOREIGN PATENT DOCUMENTS

| JP | 2016-118241 A | 6/2016 |
| KR | 10-2011-0072871 A | 6/2011 |
| KR | 10-2200094 B1 | 1/2021 |

OTHER PUBLICATIONS

Korean Office Action issued on Jun. 18, 2024, in counterpart Korean Patent Application No. 10-2022-0148709 (6 pages in English, 6 pages in Korean).

* cited by examiner

*Primary Examiner* — Richard M Lorence
(74) *Attorney, Agent, or Firm* — NSIP Law

(57) ABSTRACT

A device for preventing a reverse input includes a first housing, a second housing coupled with the first housing to define an internal space along with the first housing, an output shaft including an output disk disposed in the internal space and having one or more concave curved surfaces on an outer circumference surface of the output disk and an output shaft body configured to protrude from the output disk, an input shaft including an input disk having one or more concave grooves on an outer circumference surface thereof and an input shaft body disposed on a same rotation axis as a rotation axis of the output shaft body to protrude from the input disk, and one or more moving pins disposed on the concave grooves, respectively, to come into contact with the concave curved surfaces, respectively.

15 Claims, 16 Drawing Sheets

DEVICE FOR PREVENTING REVERSE INPUT AND STEERING DEVICE FOR PREVENTING REVERSE INPUT

CROSS-REFERENCE TO RELATED APPLICATION

This application claims the benefit under 35 U.S.C. § 119(a) of priority to Korean Patent Application No. 10-2022-0148709, filed on Nov. 9, 2022 in the Korean Intellectual Property Office, the entire disclosure of which is incorporated herein by reference for all purposes.

BACKGROUND

Field

Exemplary embodiments of the present disclosure relate to a device for preventing a reverse input and a steering device for preventing a reverse input, and more particularly, to a device for preventing a reverse input and a steering device for preventing a reverse input, which prevent the transfer of an external force that is transferred from a wheel of a vehicle.

Discussion of the Related Art

In general, an electric power-assisted steering device capable of assisting a steering manipulation of a driver is applied to a vehicle. Recently, a motor-driven power steering system (MDPS) that assists a steering manipulation of a driver by using a motor is applied to a vehicle. As one of types of such an MDPS, the MDPS may be implemented to have a structure in which a steering shaft and a steering wheel are connected electrically only. If the MDPS is implemented to have such a structure, it is necessary to block an external force that is transferred from the surface of the earth to the steering wheel.

The Background technology of the present disclosure was disclosed in Korean Patent No. 10-2200094 (registered on Jan. 4, 2021 and entitled "MDPS REVERSE INPUT TORQUE COMPENSATION SYSTEM").

SUMMARY

Various embodiments are directed to a device for preventing a reverse input and a steering device for preventing a reverse input, which can implement steering intended by a user by blocking an external force that is transferred from a steering wheel to a steering motor.

However, an object to be solved by the present disclosure is not limited to the aforementioned object, and may be variously extended without departing from the spirit and scope of the present disclosure.

In one general aspect, a device for preventing a reverse input includes a first housing, a second housing coupled with the first housing and configured to define an internal space along with the first housing, an output shaft including an output disk disposed in the internal space and having one or more concave curved surfaces on an outer circumference surface of the output disk and an output shaft body configured to protrude from the output disk, an input shaft including an input disk having one or more concave grooves on an outer circumference surface thereof and an input shaft body disposed on a same rotation axis as a rotation axis of the output shaft body and configured to protrude from the input disk, and one or more moving pins disposed on the concave grooves, respectively, and configured to come into contact with the concave curved surfaces, respectively.

A number of the concave curved surfaces may be the same as a number of the concave grooves.

A plurality of the concave grooves may be disposed to face a plurality of the concave curved surfaces, respectively.

Each moving pin may be disposed on a respective concave curved surface and respective concave groove that face each other.

Each of the plurality of concave grooves may be disposed on the outer circumference surface of the input disk at an identical rotation interval.

A distance from a deepest point of the one or more concave grooves to an inner circumference surface of the first housing or an inner circumference surface of the second housing may be greater than a distance from a deepest point of the one or more concave curved surfaces to the inner circumference surface of the first housing or the inner circumference surface of the second housing.

A width of the one or more concave grooves may be greater than a width of the one or more concave curved surfaces.

Each concave curved surface may be made of a material having a lower coefficient of friction than a material of the output disk other than the one or more concave curved surfaces.

Each concave groove may be made of a material having a lower coefficient of friction than a material of the input disk other than the one or more concave grooves.

When rotatory power is input to the input shaft, rotatory power of the one or more concave grooves of the input disk may be transferred to the output shaft through the one or more moving pins.

When the one or more concave grooves are rotated, the one or more concave curved surfaces may be rotated by the rotation of the one or more moving pins.

When rotatory power is input to the output shaft, rotatory power of the one or more concave curved surfaces of the output disk may pressurize the one or more moving pins toward an inner circumference surface of the first housing or an inner circumference surface of the second housing.

The device may include one or more elastic members respectively disposed between the one or more moving pins and the input shaft.

The device may include a bush or a washer disposed between each of the one or more moving pins and the first housing or disposed between each of the one or more moving pins and the second housing.

The input shaft may include an input shaft protrusion in the input disk. The output shaft may include an output shaft groove in the output disk. The input shaft protrusion may be inserted into the output shaft groove.

In another general aspect, a steering device includes a member; a motor connected to the member; a controller connected to the member and configured to control the motor; and a device connected to the motor and configured to prevent a reverse input. The device includes: a first housing; a second housing coupled with the first housing to define an internal space along with the first housing; an output shaft including an output disk disposed in the internal space and having one or more concave curved surfaces on an outer circumference surface of the output disk and an output shaft body configured to protrude from the output disk; an input shaft including an input disk having one or more concave grooves on an outer circumference surface thereof and an input shaft body disposed on a same rotation axis as a rotation axis of the output shaft body and configured to protrude from the input disk; and one or more moving pins disposed on the concave grooves, respectively, and configured to come into contact with the concave curved surfaces, respectively.

According to the present disclosure, driving performance that enables a vehicle to be moved as intended by a user can be improved by blocking an external force that is transferred from the surface of the earth to a steering wheel.

Other features and aspects will be apparent from the following detailed description, the drawings, and the claims.

DETAILED DESCRIPTION

Figure 1:
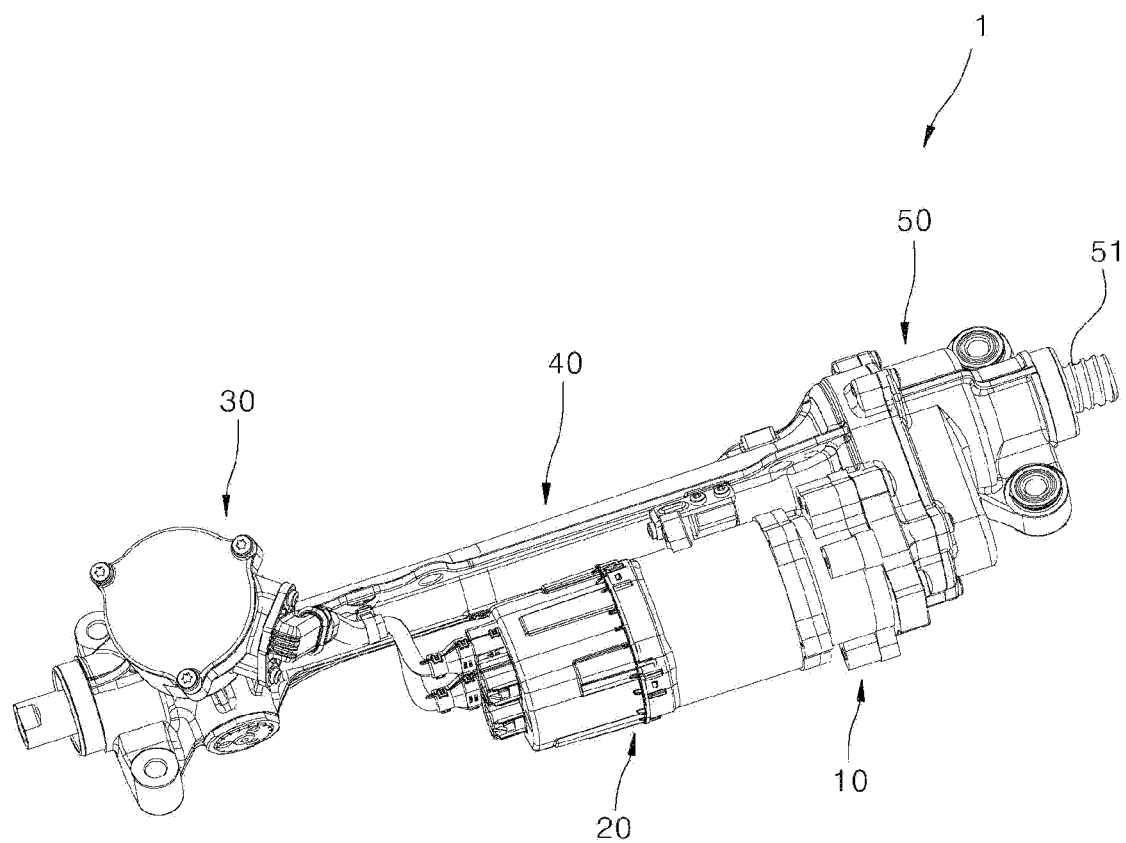
FIG. 1 is a perspective view of a steering device for preventing a reverse input according to an embodiment of the present disclosure.

Hereinafter, a device for preventing a reverse input and a steering device for preventing a reverse input will be described below with reference to the accompanying drawings through various exemplary embodiments.

In this process, the thicknesses of lines or the sizes of elements illustrated in the drawings may have been exaggerated for the clarity of a description and for convenience' sake. Furthermore, terms to be described below have been defined by taking into consideration their functions in the present disclosure, and may be changed depending on a user or operator's intention or practice. Accordingly, such terms should be defined based on the overall contents of this specification.

Furthermore, throughout the specification, when it is described that one part is "connected (or coupled)" to another part, the one part may be "directly connected (or coupled)" to the another part or may be "indirectly connected (or coupled)" to the another part with another member interposed therebetween. When it is said that one component "includes (or comprises)" the other element, this means that the one component may further "include (or comprise)" another element not the exclusion of another element unless explicitly described to the contrary.

Furthermore, throughout this specification, the same reference numerals may denote the same elements. Although not mentioned or described in a specific drawing, the same reference numerals or similar reference numerals may be described on the basis of another drawing. Furthermore, although a reference numeral is not indicated in a portion of a specific drawing, the portion may be described on the basis of another drawing. Furthermore, the number, shapes, and sizes of detailed elements included in the drawings of this application, a relative difference between the sizes, etc. have been set for convenience of understanding, and do not limit embodiments, and may be implemented in various forms.

Figure 2:
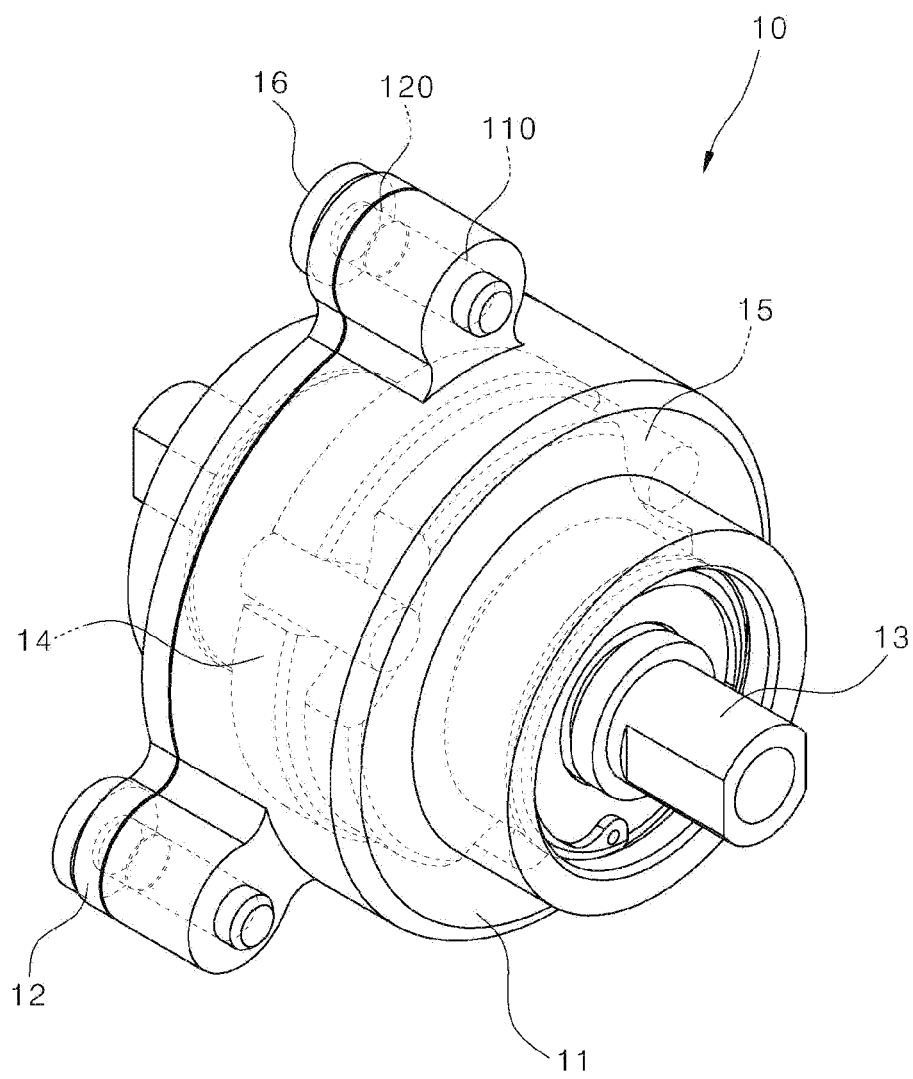
FIG. 2 is a perspective view of a device for preventing a reverse input according to an embodiment of the present disclosure.
Figure 3:
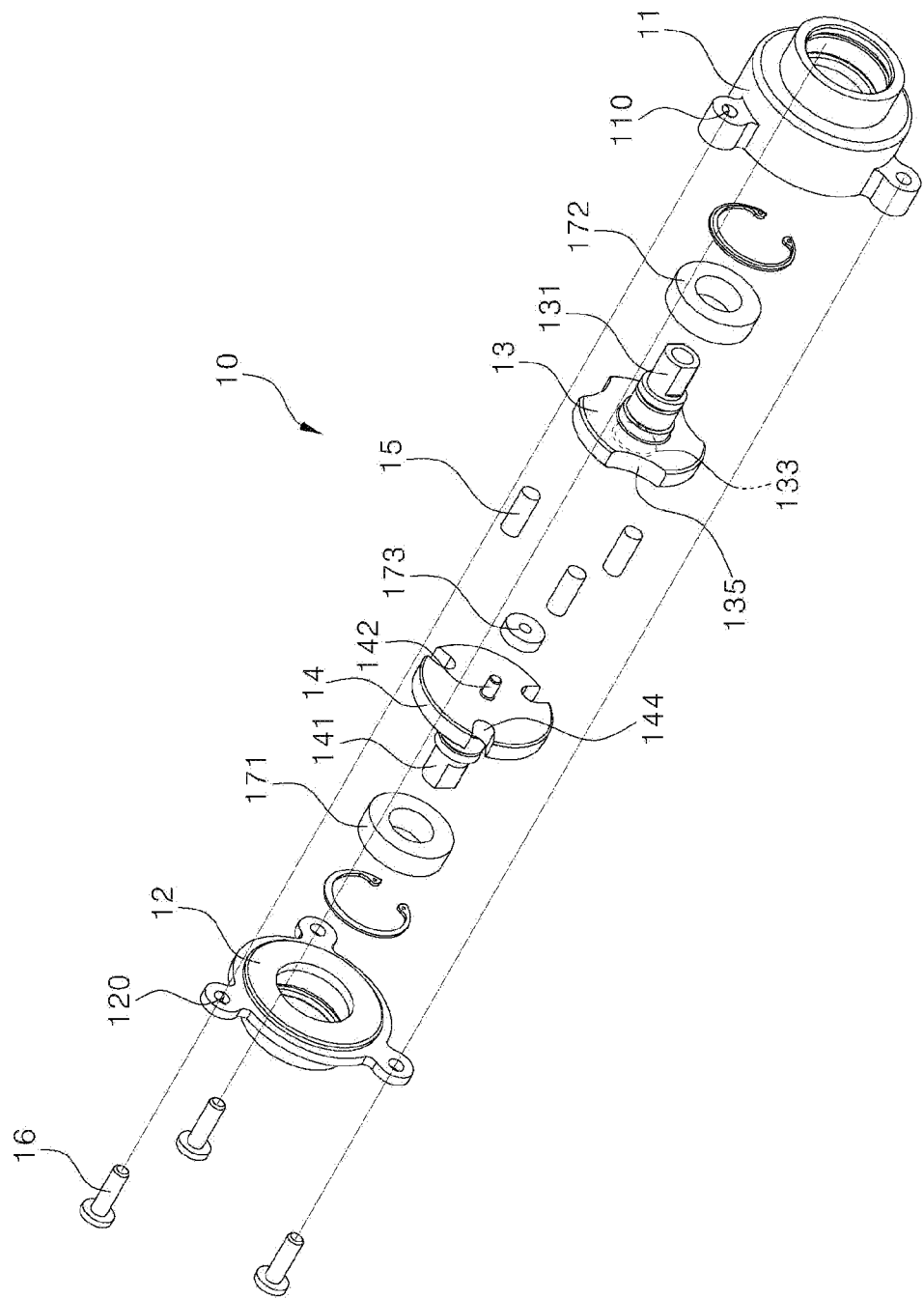
FIG. 3 is an exploded perspective view of the device for preventing a reverse input according to an embodiment of the present disclosure.
Figure 4:
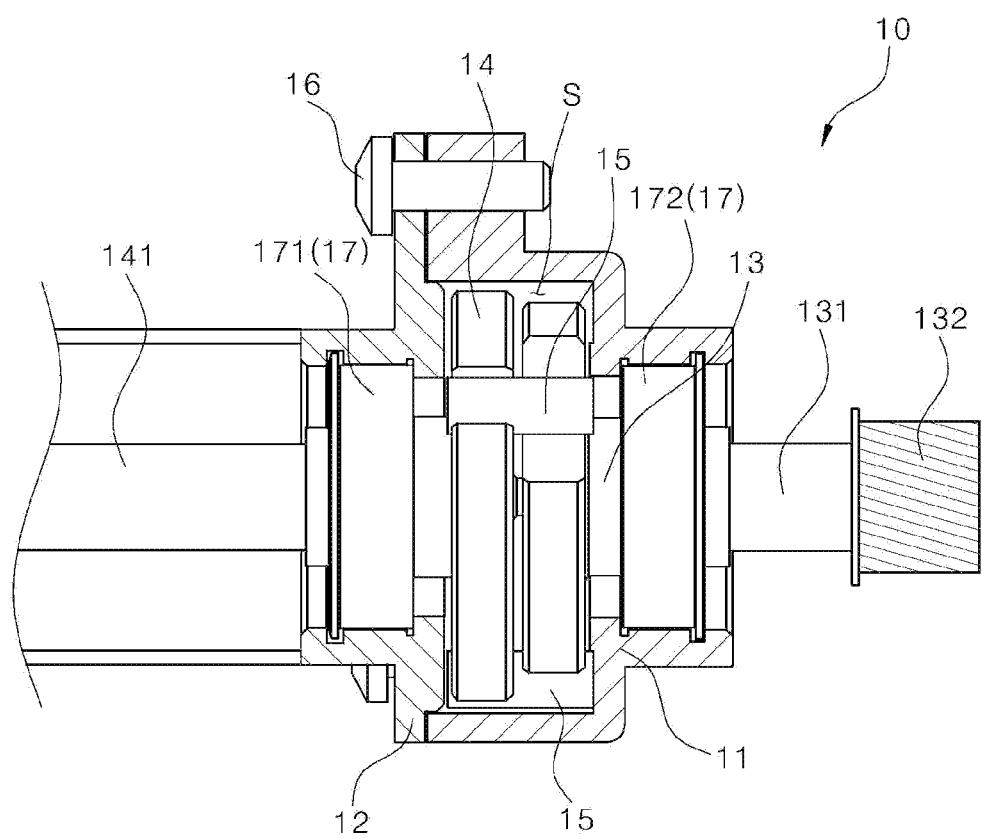
FIG. 4 is a cross-sectional view of the device for preventing a reverse input according to an embodiment of the present disclosure.
Figure 5:
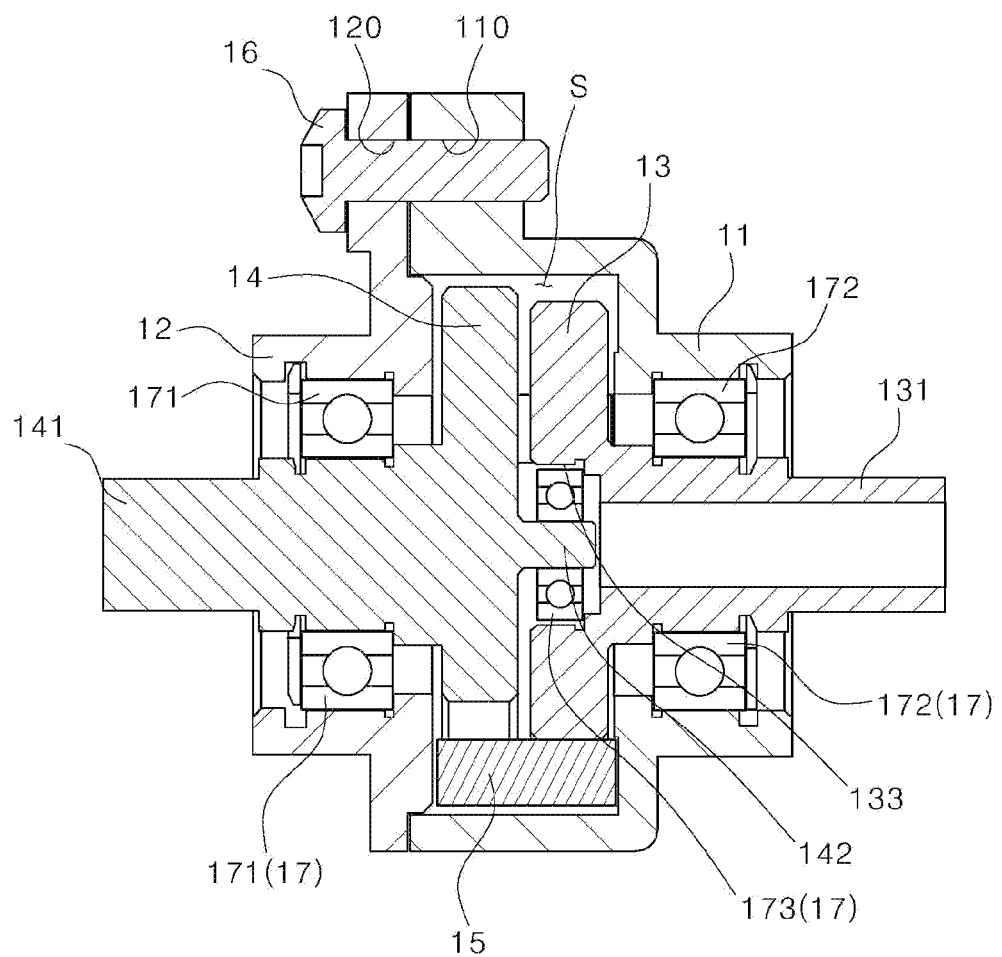
FIG. 5 is an enlarged cross-sectional view of the device for preventing a reverse input according to an embodiment of the present disclosure.
Figure 6:
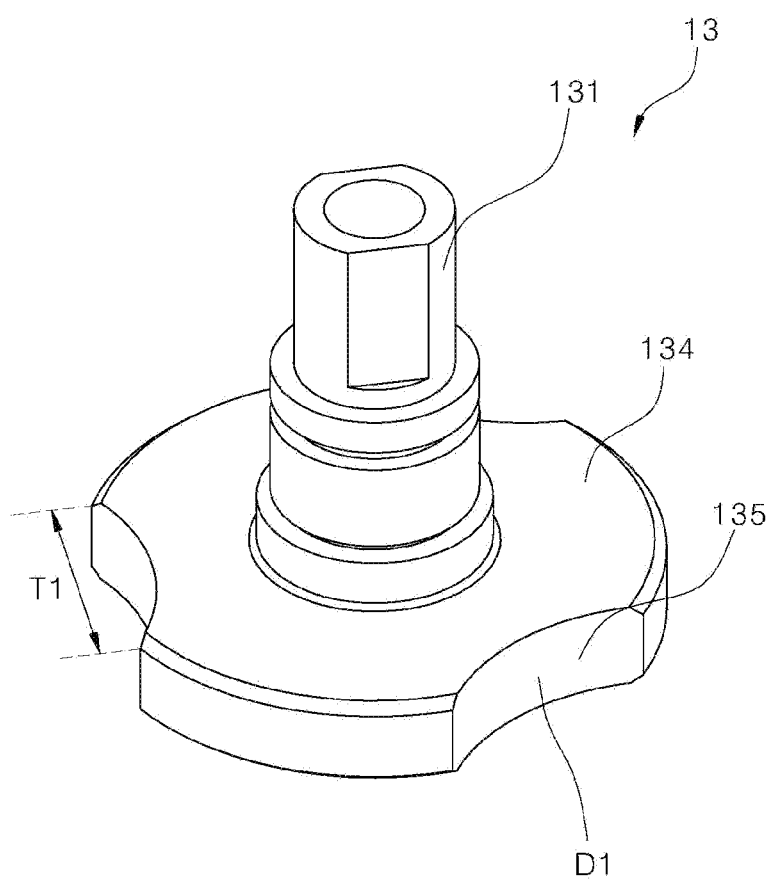
FIG. 6 is a perspective view of an output shaft according to an embodiment of the present disclosure.
Figure 7:
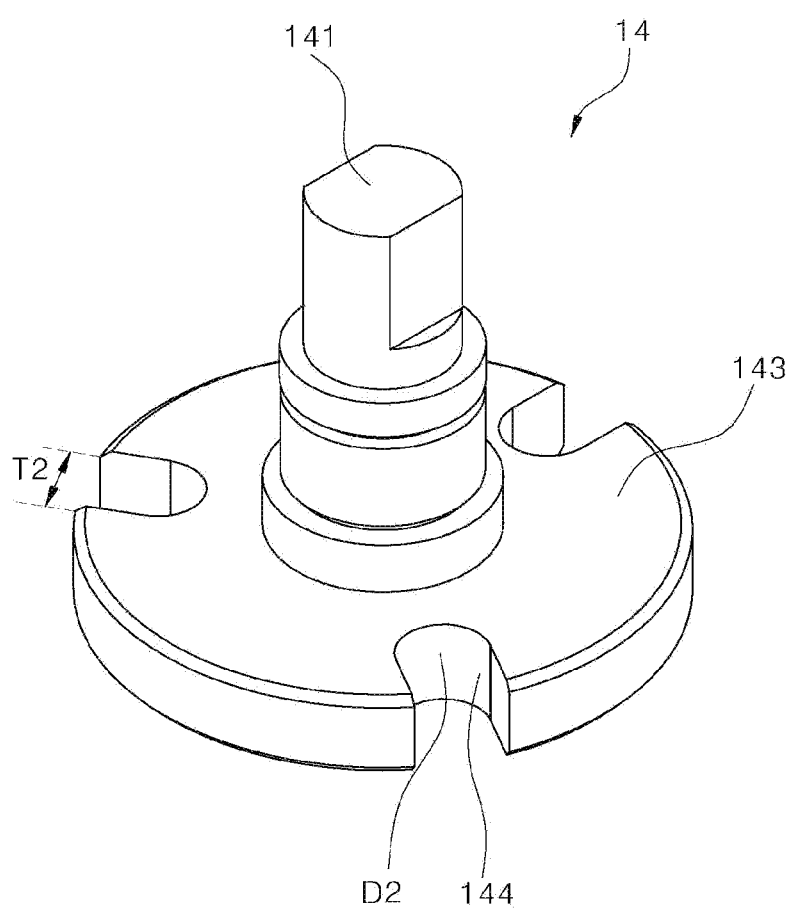
FIG. 7 is a perspective view of an input shaft according to an embodiment of the present disclosure.
Figure 8:
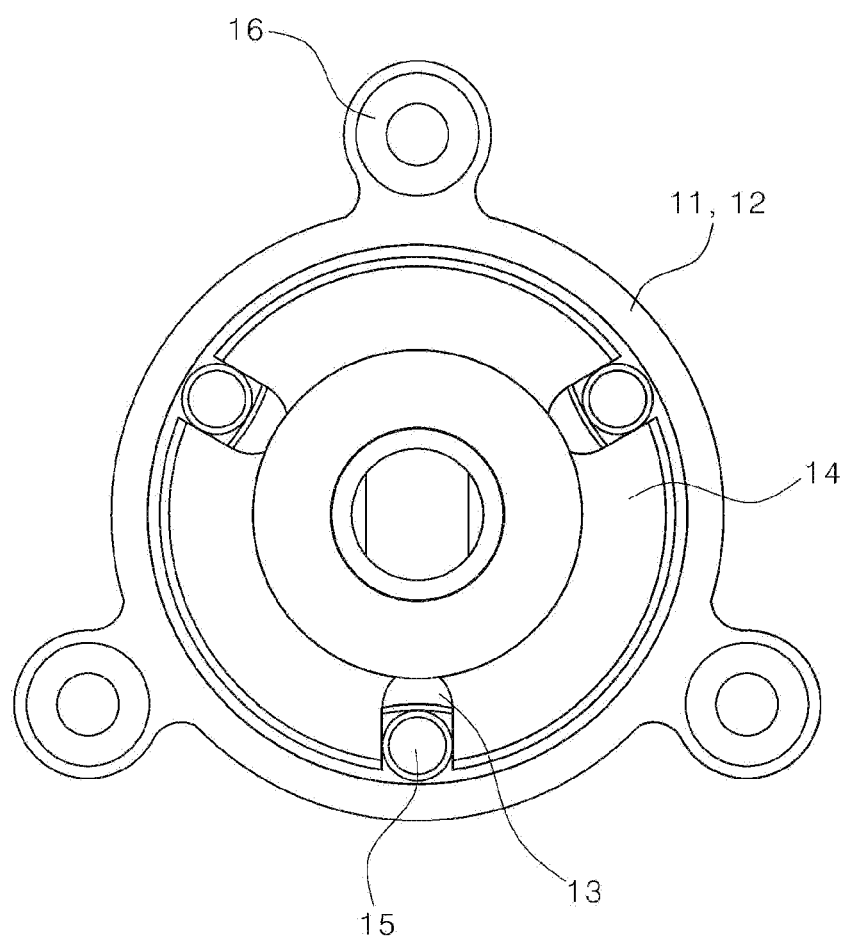
FIG. 8 is a front view of the device for preventing a reverse input according to an embodiment of the present disclosure.
Figure 9:
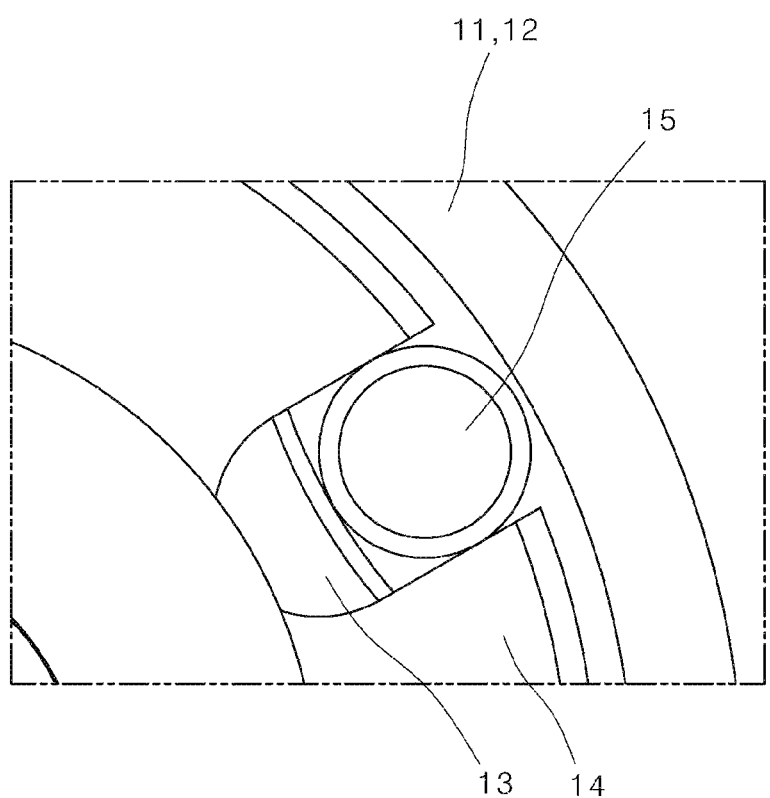
FIGS. 9 and 10 are enlarged views of parts in FIG. 8.
Figure 10:
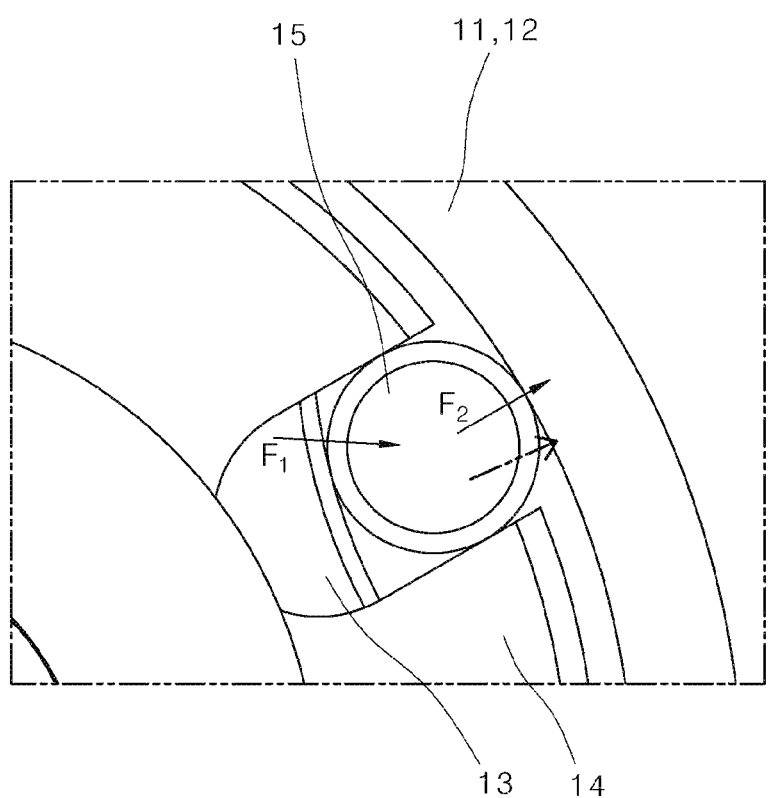
Figure 11:
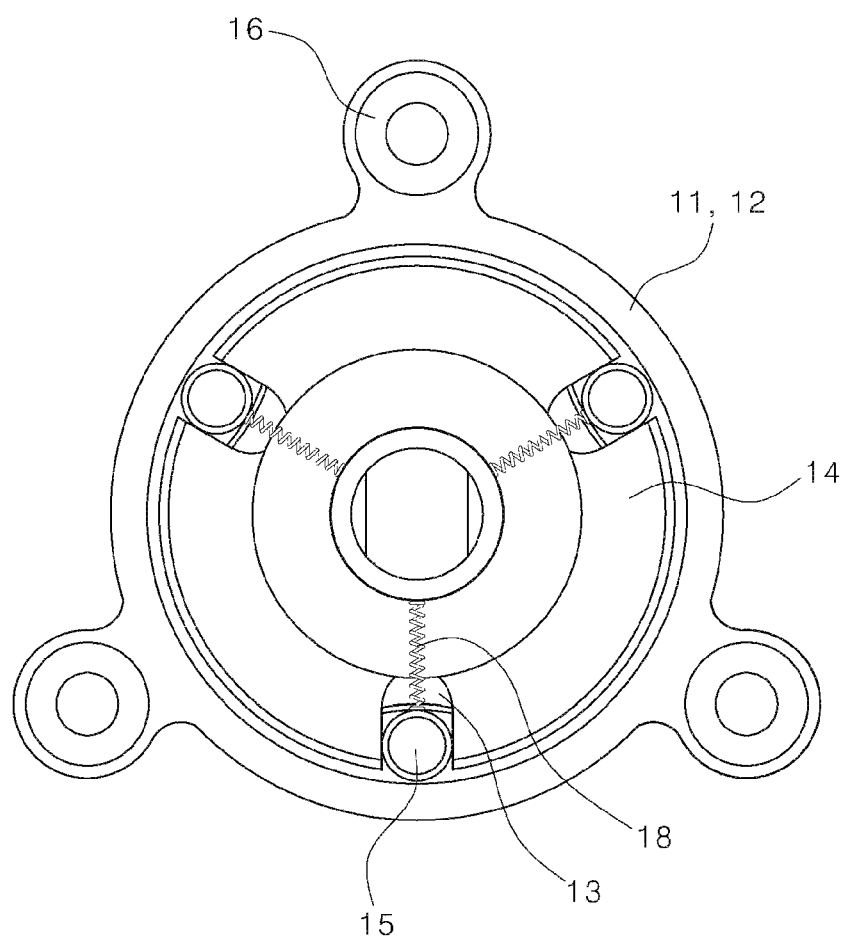
FIG. 11 illustrates a first variant of a moving pin in the device for preventing a reverse input.
Figure 12:
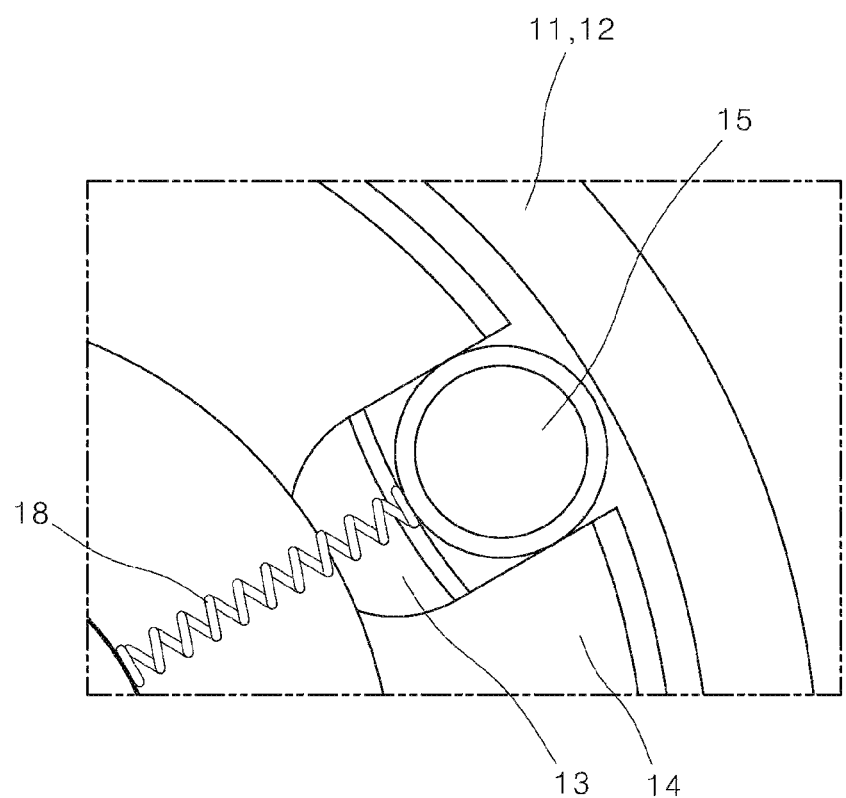
FIGS. 12 and 13 are enlarged views of parts in FIG. 11.
Figure 13:
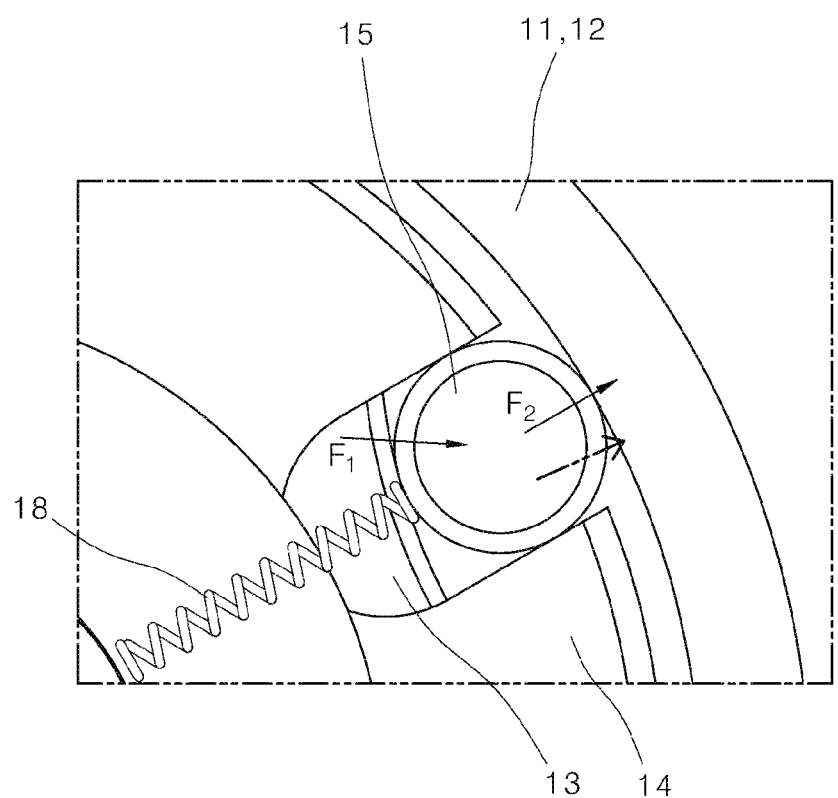
Figure 14:
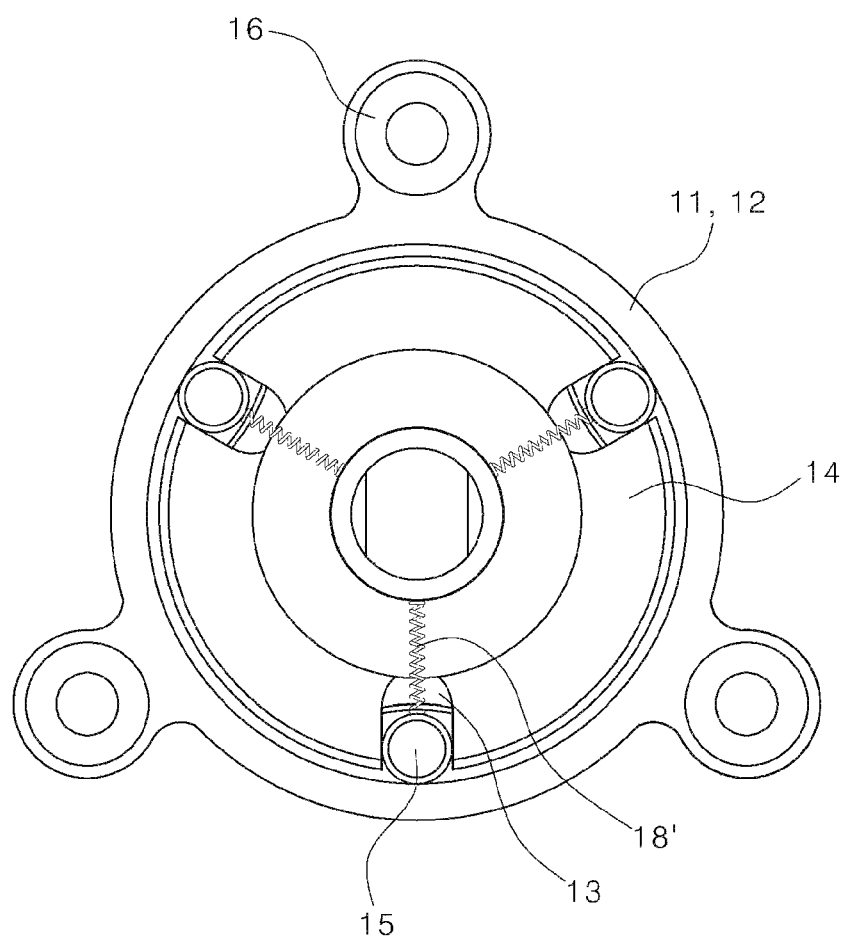
FIG. 14 illustrates a second variant of a moving pin in the device for preventing a reverse input.
Figure 15:
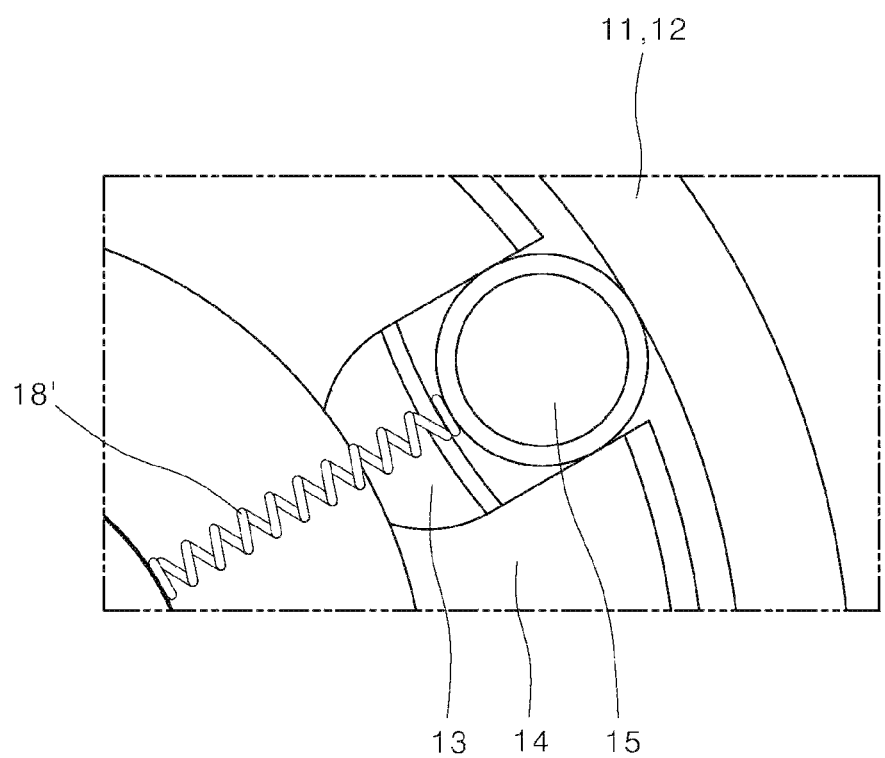
FIGS. 15 and 16 are enlarged views of parts in FIG. 14.
Figure 16:
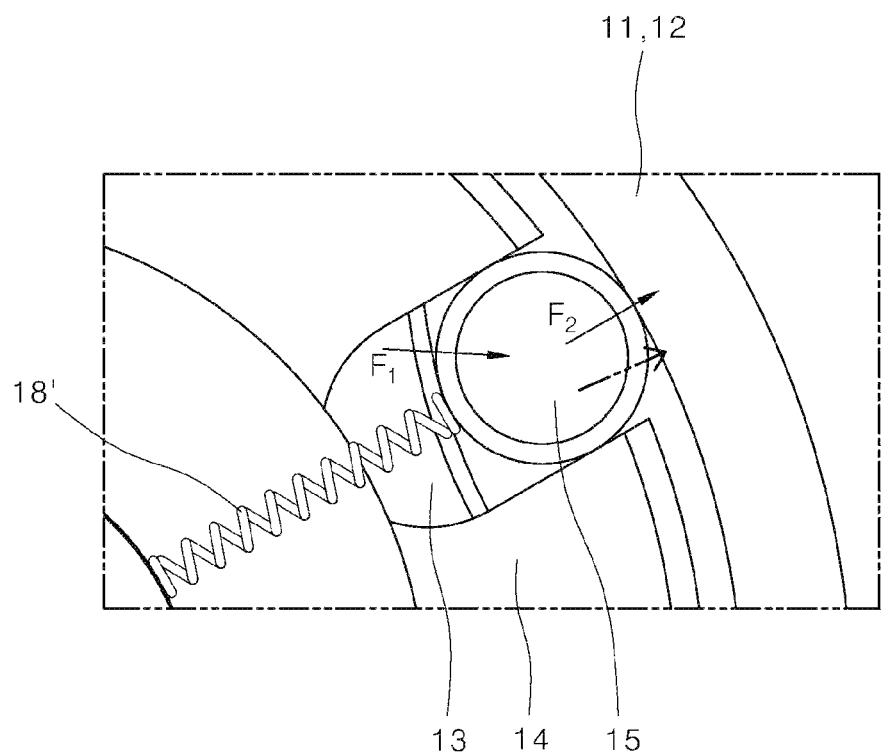

FIG. 1 is a perspective view of a steering device for preventing a reverse input according to an embodiment of the present disclosure. FIG. 2 is a perspective view of a device for preventing a reverse input according to an embodiment of the present disclosure. FIG. 3 is an exploded perspective view of the device for preventing a reverse input according to an embodiment of the present disclosure. FIG. 4 is a cross-sectional view of the device for preventing a reverse input according to an embodiment of the present disclosure. FIG. 5 is an enlarged cross-sectional view of the device for preventing a reverse input according to an embodiment of the present disclosure. FIG. 6 is a perspective view of an output shaft according to an embodiment of the present disclosure. FIG. 7 is a perspective view of an input shaft according to an embodiment of the present disclosure. FIG. 8 is a front view of the device for preventing a reverse input according to an embodiment of the present disclosure. FIGS. 9 and 10 are enlarged views of parts in FIG. 8. FIG. 11 illustrates a first variant of a moving pin in the device for preventing a reverse input. FIGS. 12 and 13 are enlarged views of parts in FIG. 11. FIG. 14 illustrates a second variant of a moving pin in the device for preventing a reverse input. FIGS. 15 and 16 are enlarged views of parts in FIG. 14.

A steering device 1 for preventing a reverse input according to an embodiment of the present disclosure may include a device 10 for preventing a reverse input, a motor 20, a controller 30, a member 40, and a steering 50. The device 10 for preventing a reverse input, the motor 20, the controller 30, and the steering 50 may be disposed in the member 40.

According to an embodiment of the present disclosure, the controller 30 may drive a motor (not illustrated) included in the motor 20 by controlling the motor 20, and may drive the steering 50 via the device 10 for preventing a reverse input through the driving of the motor.

According to an embodiment of the present disclosure, as a steering screw 51 of the steering 50 is rotated, the length of the steering screw 51 that protrudes from the steering device 1 for preventing a reverse input may be changed. The steering screw 51 is connected to a wheel of a vehicle, and may change the steering angle of the wheel of the vehicle.

An external force that is transferred from the wheel may be transferred to the device 10 for preventing a reverse input through the steering screw 51 connected to the wheel and the steering 50. The external force transferred to the device 10 for preventing a reverse input may not be transferred to the motor 20 by the device 10 for preventing a reverse input. Accordingly, a user can feel ease because the user can maintain his or her intended steering, and thus driving performance of the vehicle can be improved.

The steering device 1 for preventing a reverse input may be applied to all wheels of a vehicle. The device 10 for preventing a reverse input, which blocks the transfer of an external force, is described with reference to FIGS. 2 to 5.

Referring to FIGS. 2 to 10, the device 10 for preventing a reverse input according to an embodiment of the present disclosure may include a first housing 11, a second housing 12, an output shaft 13, an input shaft 14, and a moving pin 15. The device 10 for preventing a reverse input may further include a fixing member 16 and a bearing 17.

The first housing 11 and the second housing 12 may be coupled. A first housing hole 110 may be formed in the first housing 11. A second housing hole 120 may be formed in the second housing 12.

The fixing member 16 may fix the first housing 11 and the second housing 12 through the first housing hole 110 and the second housing hole 120. The fixing member 16 may be a screw.

The first housing 11 and the second housing 12 may be combined to form an internal space S of the device 10 for preventing a reverse input. The output shaft 13, the input shaft 14, the moving pin 15, and the bearing 17 may be accommodated in the internal space S that is formed by the first housing 11 and the second housing 12. The bearing 17 may include a first bearing 171, a second bearing 172, and a third bearing 173.

The output shaft 13 may include an output shaft body 131, an output shaft groove 133, and an output disk 134. The output shaft 13 is disposed in the internal space S.

The output shaft body 131 extends toward the front of a central part of the output disk 134.

The output shaft groove 133 is concavely formed in the output disk 134 in a direction that is opposite to a portion where the output shaft body 131 is connected to the output disk 134. The output shaft body 131 is formed in a first surface of the output disk 134 in a way to protrude therefrom. The output shaft groove 133 is concavely formed in a second surface of the output disk 134. The first surface and second surface of the output disk 134 are surfaces that are disposed on sides opposite to each other.

The output disk 134 is formed to extend to the outside in a radial direction thereof compared to the output shaft body 131. That is, the output disk 134 is formed to have a greater external diameter than the output shaft body 131.

The output shaft 13 may further include an output pulley 132. The output pulley 132 is a driving pulley, and may be coupled to the end of the output shaft body 131. The output pulley 132 may be connected to a belt or a chain. The belt or chain connected to the output pulley 132 may be connected to the steering 50, and may be rotated.

The output shaft 13 may include one or more concave curved surfaces 135 on the outer circumference surface of the output disk 134. According to an embodiment, three concave curved surfaces 135 may be formed in the outer circumference surface of the output shaft 13. Rotation intervals between the concave curved surfaces 135 may be identically disposed on the outer circumference surface of the output disk 134. The concave curved surface 135 may be formed as a curved surface that is concave toward the inside of the output disk 134 in the radial direction thereof. The number of concave curved surfaces 135 may be the same as the number of concave grooves 144.

The input shaft 14 may include an input shaft body 141, an input shaft protrusion 142, and an input disk 143.

The input shaft body 141 extends from a central part of the input disk 143 to the front thereof.

The input shaft protrusion 142 is formed in the input disk 143 in a way to protrude therefrom in a direction that is opposite to a portion where the input shaft body 141 is connected to the input disk 143. The input shaft body 141 is formed in a first surface of the input disk 143 in a way to protrude therefrom. The input shaft protrusion 142 is concavely formed in a second surface of the input disk 143. The first surface and second surface of the input disk 143 are surfaces that are disposed on sides opposite to each other.

The input disk 143 is formed to extend to the outside in a radial direction thereof compared to the input shaft body 141. That is, the input disk 143 is formed to have a greater external diameter than the input shaft body 141.

One or more concave grooves 144 may be formed in the outer circumference surface of the input disk 143 of the input shaft 14. According to an embodiment, three concave grooves 144 may be formed in the outer circumference surface of the input shaft 14. Rotation intervals between the concave grooves 144 may be identically disposed on the outer circumference surface of the input disk 143.

The concave groove 144 may be formed in a U-shaped form toward the inside of the input disk 143 in the radial direction thereof. The number of concave grooves 144 and the number of concave curved surfaces 135 may be the same. The concave grooves 144 may be disposed to face the concave curved surfaces 135, respectively.

A distance from the deepest point D2 of the concave groove 144 to the inner circumference surface of the first housing 11 or the inner circumference surface of the second housing 12 may be longer than a distance from the deepest point D1 of the concave curved surface 135 to the inner circumference surface of the first housing 11 or the inner circumference surface of the second housing 12. A width T2 of the concave groove 144 may be greater than a width T1 of the concave curved surface 135.

Accordingly, when rotatory power is input to the input shaft 14, the rotatory power of the concave groove 144 of the input disk 143 may be transferred to the output shaft 13 through the moving pin 15. That is, when the concave groove 144 is rotated, the moving pin 15 is also rotated. The concave curved surface 135 is rotated by the rotation of the moving pin 15. Accordingly, when an external force is applied to the input shaft 14, the rotatory power is transferred to the output shaft 13 through the moving pin 15.

In contrast, when rotatory power is input to the output shaft 13, the rotatory power of the concave curved surface 135 of the output disk 134 pressurizes the moving pin 15 toward the inner circumference surface of the first housing 11 or the inner circumference surface of the second housing 12(see FIG. 10). That is, when the concave curved surface 135 is rotated, the rotatory power of the concave curved surface 135 moves the moving pin 15 in a direction in which the moving pin 15 is pushed to the outside, instead of rotating the moving pin 15. Accordingly, the moving pin 15 is gradually closely attached to the inner circumference surface of the first housing 11 or the second housing 12. The output shaft 13 is no longer rotated by a normal force between the moving pin 15 and the first housing 11 or the second housing 12. Accordingly, although an external force is applied to the output shaft 13 as described above, the rotatory power is not transferred to the input shaft 14 because the moving pin 15 is rubbed and fixed on the first housing 11 or the second housing 12 by the concave curved surface 135.

The output shaft 13 and the input shaft 14 may be accommodated in the internal space S that is formed by the first housing 11 and the second housing 12. According to the present embodiment, a part of the output shaft body 131 and a part of the input shaft body 141 may protrude to the outside of the internal space S formed by the first housing 11 and the second housing 12.

The output shaft body 131 and the input shaft body 141 may be disposed on the same rotation axis. At least a part of the input shaft protrusion 142 may be inserted into the output shaft groove 133.

The third bearing 173 may be disposed between the input shaft protrusion 142 and the output shaft groove 133. As the third bearing 173 is disposed between the input shaft protrusion 142 and the output shaft groove 133, friction between the output shaft 13 and the input shaft 14 is reduced upon rotation.

In the present embodiment, it has been illustrated that the input shaft protrusion 142 is provided in the input shaft 14 and the output shaft groove 133 is provided in the output shaft 13, but the present disclosure is not limited thereto. Accordingly, the present disclosure may include a structure in which the input shaft concave is provided in the input shaft 14, the output shaft protrusion is provided in the output shaft 13, and the output shaft protrusion is inserted into the input shaft concave.

At least a part of the output shaft body 131 may protrude to the outside through a hole formed in the first housing 11. The second bearing 172 may be disposed between an external surface of the output shaft body 131 and an internal surface of the first housing 11. Accordingly, friction can be reduced when the output shaft body 131 is rotated with respect to the first housing 11.

At least a part of the input shaft body 141 may protrude to the outside through a hole formed in the second housing 12. The first bearing 171 may be disposed between an external surface of the input shaft body 141 and an internal surface of the second housing 12. Accordingly, friction can be reduced when the input shaft body 141 is rotated with respect to the second housing 12.

When the output shaft 13 and the input shaft 14 face each other, that is, when the output disk 134 and the input disk 143 are disposed to face each other, the concave curved surface 135 and the concave groove 144 may be disposed to face each other.

One or more moving pins 15 may be disposed on the concave groove 144, and may be disposed to come into contact with the concave curved surface 135. That is, the one or more moving pins 15 may be inserted into the concave groove 144, and may be rubbed against the concave curved surface 135. The moving pin 15 and the concave curved surface 135 may be disposed to always come into contact with each other. The rotation of the concave curved surface 135 may be directly transferred to the moving pin 15.

According to an embodiment, three moving pins 15 may be provided. The moving pins 15 may be disposed in the concave grooves 144 and the concave curved surfaces 135, respectively.

The moving pin 15 is disposed in the concave groove 144 and the concave curved surface 135. Accordingly, when the input shaft 14 is rotated by the driving of the motor, the concave groove 144 on the input disk 143 is rotated by the rotation of the input shaft body 141. As the concave groove 144 is rotated, the moving pin 15 that is inserted into and disposed in the concave groove 144 is rotated. As the moving pin 15 is rotated, the moving pin 15 rotates the concave curved surface 135 by pressurizing the concave curved surface 135. Accordingly, the rotation of the input shaft 14 may be transferred to the rotation of the output shaft 13.

A bush and/or a washer may be disposed between the moving pin 15 and the first housing 11. A bush and/or a washer may be disposed between the moving pin 15 and the second housing 12. As the bush and/or the washer are disposed, the abrasion of the first housing 11 and the second housing 12 can be reduced.

The concave curved surface 135 of the output shaft 13 may be made of a low friction material. The coefficient of friction of the concave curved surface 135 may be smaller than the coefficient of friction of the output disk 134 not the concave curved surface 135.

The concave groove 144 of the input shaft 14 may be made of a low friction material. The coefficient of friction of the concave groove 144 may be smaller than the coefficient of friction of the input disk 143 not the concave groove 144.

The moving pin 15 may be disposed in the concave curved surface 135 and the concave groove 144, and may transfer rotatory power of the concave groove 144 to the concave curved surface 135. Accordingly, the rotatory power of the input shaft 14 may be transferred to the output shaft 13.

FIG. 9 illustrates the state in which in the device 10 for preventing a reverse input according to an embodiment of the present disclosure, rotatory power has been transferred to the output shaft 13 through the input shaft 14 or rotatory power has not been transferred to the device 10 for preventing a reverse input. The moving pin 15 may be disposed in the concave groove 144 of the input shaft 14 and the concave curved surface 135 of the output shaft 13. The moving pin 15 may not come into contact with the first housing 11 and/or the second housing 12. In this case, the concave curved surface 135 of the output shaft 13 may maintain a regular position with respect to the concave groove 144 of the input shaft 14. The regular position may mean that the tangent line of a portion where the moving pin 15 and the concave curved surface 135 come into contact with each other is parallel to a line that is perpendicular to the radial direction of the input shaft 14. Alternatively, at the regular position, the portion where the moving pin 15 and the concave curved surface 135 come into contact with each other may be a central part of the concave curved surface 135.

As described above, when rotatory power is transferred to the output shaft 13 through the input shaft 14 or rotatory power is not transferred to the device 10 for preventing a reverse input, the moving pin 15 may not come into contact with the internal surface of the first housing 11 and/or the internal surface of the second housing 12. Accordingly, the input shaft 14 can be rotated.

FIG. 10 illustrates the state in which the output shaft 13 is rotated in the device 10 for preventing a reverse input. The moving pin 15 may be disposed in the concave groove 144 of the input shaft 14 and the concave curved surface 135 of the output shaft 13. The moving pin 15 may come into contact with the first housing 11 and/or the second housing 12. In this case, the concave curved surface 135 of the output shaft 13 may maintain an abnormal location with respect to the concave groove 144 of the input shaft 14. The abnormal location may mean a portion other than a portion where the moving pin 15 and the concave curved surface 135 come into contact with each other, that is, a central portion of the concave curved surface 135.

It may be seen that the concave curved surface 135 of the output shaft 13 is differently disposed by comparing FIGS. 9 and 10. The concave curved surface 135 in FIG. 9 is constructed to be perpendicular to the radial direction of the input shaft 14, whereas the concave curved surface 135 in FIG. 10 is constructed to be inclined with respect to the radial direction of the input shaft 14. As described above, when rotary power is transferred from the output shaft 13, the concave curved surface 135 applies a first force F1 to the moving pin 15 in the inclined direction thereof, and the moving pin 15 transfers a second force F2 to the outside of a radial direction thereof by the first force F1. Accordingly, the moving pin 15 may not be rotated because friction occurs between the moving pin 15 and the first housing 11 and/or the second housing 12. As described above, when the output shaft 13 rotates first, the moving pin 15 comes into contact with the internal surface of the first housing 11 and/or the internal surface of the second housing 12, so that the output shaft 13 and the input shaft 14 no longer rotate. Accordingly, a reverse input that is transferred from the output shaft 13 to the input shaft 14 can be prevented.

Referring to FIGS. 11 to 13, an elastic member 18 may be disposed between a central axis of the input shaft 14 and the moving pin 15. A compression force may act on the elastic member 18 between the central axis of the input shaft 14 and the moving pin 15. The elastic member 18 on which the compression force acts pulls the moving pin 15 toward the central axis of the input shaft 14.

FIG. 12 illustrates the state in which in the device 10 for preventing a reverse input according to an embodiment of the present disclosure, rotatory power has been transferred to the output shaft 13 through the input shaft 14 or rotatory power has not been transferred to the device 10 for preventing a reverse input. The moving pin 15 may be disposed in the concave groove 144 of the input shaft 14 and the concave curved surface 135 of the output shaft 13. The moving pin 15 may not come into contact with the first housing 11 and/or the second housing 12. In this case, the concave curved surface 135 of the output shaft 13 may maintain a regular position with respect to the concave groove 144 of the input shaft 14. The regular position may mean that the tangent line of a portion where the moving pin 15 and the concave curved surface 135 come into contact with each other is parallel to a line that is perpendicular to the radial direction of the input shaft 14. Alternatively, at the regular position, the portion where the moving pin 15 and the concave curved surface 135 come into contact with each other may be a central part of the concave curved surface 135.

As described above, when rotatory power is transferred to the output shaft 13 through the input shaft 14 or rotatory power is not transferred to the device 10 for preventing a reverse input, the moving pin 15 may not come into contact with the internal surface of the first housing 11 and/or the internal surface of the second housing 12. Accordingly, the input shaft 14 can be rotated.

FIG. 13 illustrates the state in which the output shaft 13 is rotated in the device 10 for preventing a reverse input. The moving pin 15 may be disposed in the concave groove 144 of the input shaft 14 and the concave curved surface 135 of the output shaft 13. The moving pin 15 may overcome the compression force of the elastic member 18 may come into contact with the first housing 11 and/or the second housing 12. In this case, the concave curved surface 135 of the output shaft 13 may maintain an abnormal location with respect to the concave groove 144 of the input shaft 14.

When rotatory power is transferred from the output shaft 13, the concave curved surface 135 applies a first force F1 to the moving pin 15 in the inclined direction thereof, and the moving pin 15 transfers a second force F2 to the outside of a radial direction thereof by the first force F1. Accordingly, the moving pin 15 will not be rotated because friction occurs between the moving pin 15 and the first housing 11 and/or the second housing 12. As described above, when the output shaft 13 rotates first, the moving pin 15 comes into contact with the internal surface of the first housing 11 and/or the internal surface of the second housing 12, so that the output shaft 13 and the input shaft 14 no longer rotate. Accordingly, a reverse input that is transferred from the output shaft 13 to the input shaft 14 can be prevented.

Referring to FIGS. 14 to 16, an elastic member 18 may be disposed between a central axis of the input shaft 14 and the moving pin 15. A tensile force may act on the elastic member 18 between the central axis of the input shaft 14 and the moving pin 15. The elastic member 18 on which the tensile force acts pushes the moving pin 15 out of the central axis of the input shaft 14. The moving pin 15 may be in contact with the first housing 11 and/or the second housing 12.

FIG. 15 illustrates the state in which in the device 10 for preventing a reverse input according to an embodiment of the present disclosure, rotatory power has been transferred to the output shaft 13 through the input shaft 14 or rotatory power has not been transferred to the device 10 for preventing a reverse input. The moving pin 15 may be disposed in the concave groove 144 of the input shaft 14 and the concave curved surface 135 of the output shaft 13. The moving pin 15 may come into contact with the first housing 11 and/or the second housing 12. In this case, the concave curved surface 135 of the output shaft 13 may maintain a regular position with respect to the concave groove 144 of the input shaft 14. The regular position may mean that the tangent line of a portion where the moving pin 15 and the concave curved surface 135 come into contact with each other is parallel to a line that is perpendicular to the radial direction of the input shaft 14. Alternatively, at the regular position, the portion where the moving pin 15 and the concave curved surface 135 come into contact with each other may be a central part of the concave curved surface 135.

Even if the moving pin 15 contacts the internal surface of the first housing 11 and/or the internal surface of the second housing 12, the input shaft 14 can be rotated if the friction force is not large.

FIG. 16 illustrates the state in which the output shaft 13 is rotated in the device 10 for preventing a reverse input. The moving pin 15 may be disposed in the concave groove 144 of the input shaft 14 and the concave curved surface 135 of the output shaft 13. In this case, the concave curved surface 135 of the output shaft 13 may be placed an abnormal location with respect to the concave groove 144 of the input shaft 14.

When rotatory power is transferred from the output shaft 13, the concave curved surface 135 applies a first force F1 to the moving pin 15 in the inclined direction thereof, and the moving pin 15 transfers a second force F2 to the outside of a radial direction thereof by the first force F1. Accordingly, the moving pin 15 will not be rotated because friction occurs between the moving pin 15 and the first housing 11 and/or the second housing 12. As described above, when the output shaft 13 rotates first, the moving pin 15 is rubbed against the internal surface of the first housing 11 and/or the internal surface of the second housing 12, so that the output shaft 13 and/or the input shaft 14 no longer rotate. Accordingly, a reverse input that is transferred from the output shaft 13 to the input shaft 14 can be prevented.

The present disclosure has been described above based on the embodiments illustrated in the accompanying drawings, but the embodiments are merely illustrative. A person having ordinary knowledge in the art to which the present disclosure pertains will understand that various modifications and other equivalent embodiments are possible from the embodiments.

Accordingly, the technical range of protection of the present disclosure should be determined by the claims.

What is claimed is:

1. A device for preventing a reverse input, comprising:
a first housing;
a second housing coupled with the first housing and configured to define an internal space along with the first housing;
an output shaft comprising an output disk disposed in the internal space and having one or more concave curved surfaces on an outer circumference surface of the output disk and an output shaft body configured to protrude from the output disk;
an input shaft comprising an input disk having one or more concave grooves on an outer circumference surface thereof and an input shaft body disposed on a same rotation axis as a rotation axis of the output shaft body and configured to protrude from the input disk;
one or more moving pins disposed on the concave grooves, respectively, and configured to come into contact with the concave curved surfaces, respectively; and
one or more elastic members respectively disposed between the one or more moving pins and the input shaft.

2. The device of claim 1, wherein
a number of the concave curved surfaces is the same as a number of the concave grooves.

3. The device of claim 2, wherein a plurality of the concave grooves is disposed to face a plurality of the concave curved surfaces, respectively.

4. The device of claim 3, wherein
each moving pin is disposed on a respective concave curved surface and respective concave groove that face each other.

5. The device of claim 4, wherein each of the plurality of concave grooves is disposed on the outer circumference surface of the input disk at an identical rotation interval.

6. The device of claim 1, wherein a distance from a deepest point of the one or more concave grooves to an inner circumference surface of the first housing or an inner circumference surface of the second housing is greater than a distance from a deepest point of the one or more concave curved surfaces to the inner circumference surface of the first housing or the inner circumference surface of the second housing.

7. The device of claim 6, wherein a width of the one or more concave grooves is greater than a width of the one or more concave curved surfaces.

8. The device of claim 7, wherein each concave curved surface is made of a material having a lower coefficient of friction than a material of the output disk other than the one or more concave curved surfaces.

9. The device of claim 7, wherein each concave groove is made of a material having a lower coefficient of friction than a material of the input disk other than the one or more concave grooves.

10. The device of claim 1, wherein when rotatory power is input to the input shaft, rotatory power of the one or more concave grooves of the input disk is transferred to the output shaft through the one or more moving pins.

11. The device of claim 10, wherein when the one or more concave grooves are rotated, the one or more concave curved surfaces are rotated by the rotation of the one or more moving pins.

12. The device of claim 1, wherein when rotatory power is input to the output shaft, rotatory power of the one or more concave curved surfaces of the output disk pressurizes the one or more moving pins toward an inner circumference surface of the first housing or an inner circumference surface of the second housing.

13. The device of claim 1, wherein
the input shaft comprises an input shaft protrusion in the input disk,
the output shaft comprises an output shaft groove in the output disk, and
the input shaft protrusion is inserted into the output shaft groove.

14. A steering device, comprising:
a member;
a motor connected to the member;
a controller connected to the member and configured to control the motor; and
a device connected to the motor and configured to prevent a reverse input,
wherein the device connected to the motor and configured to prevent the reverse input comprises:
a first housing;
a second housing coupled with the first housing to define an internal space along with the first housing;
an output shaft comprising an output disk disposed in the internal space and having one or more concave curved surfaces on an outer circumference surface of the output disk and an output shaft body configured to protrude from the output disk;
an input shaft comprising an input disk having one or more concave grooves on an outer circumference surface thereof and an input shaft body disposed on a same rotation axis as a rotation axis of the output shaft body and configured to protrude from the input disk; and
one or more moving pins disposed on the concave grooves, respectively, and configured to come into contact with the concave curved surfaces, respectively.

15. A device for preventing a reverse input, comprising:
a first housing;
a second housing coupled with the first housing and configured to define an internal space along with the first housing;
an output shaft comprising an output disk disposed in the internal space and having one or more concave curved surfaces on an outer circumference surface of the output disk and an output shaft body configured to protrude from the output disk;
an input shaft comprising an input disk having one or more concave grooves on an outer circumference surface thereof and an input shaft body disposed on a same rotation axis as a rotation axis of the output shaft body and configured to protrude from the input disk; and
one or more moving pins disposed on the concave grooves, respectively, and configured to come into contact with the concave curved surfaces, respectively,
wherein when rotatory power is input to the output shaft, rotatory power of the one or more concave curved surfaces of the output disk pressurizes the one or more moving pins toward an inner circumference surface of the first housing or an inner circumference surface of the second housing.

* * * * *